Figure 1:
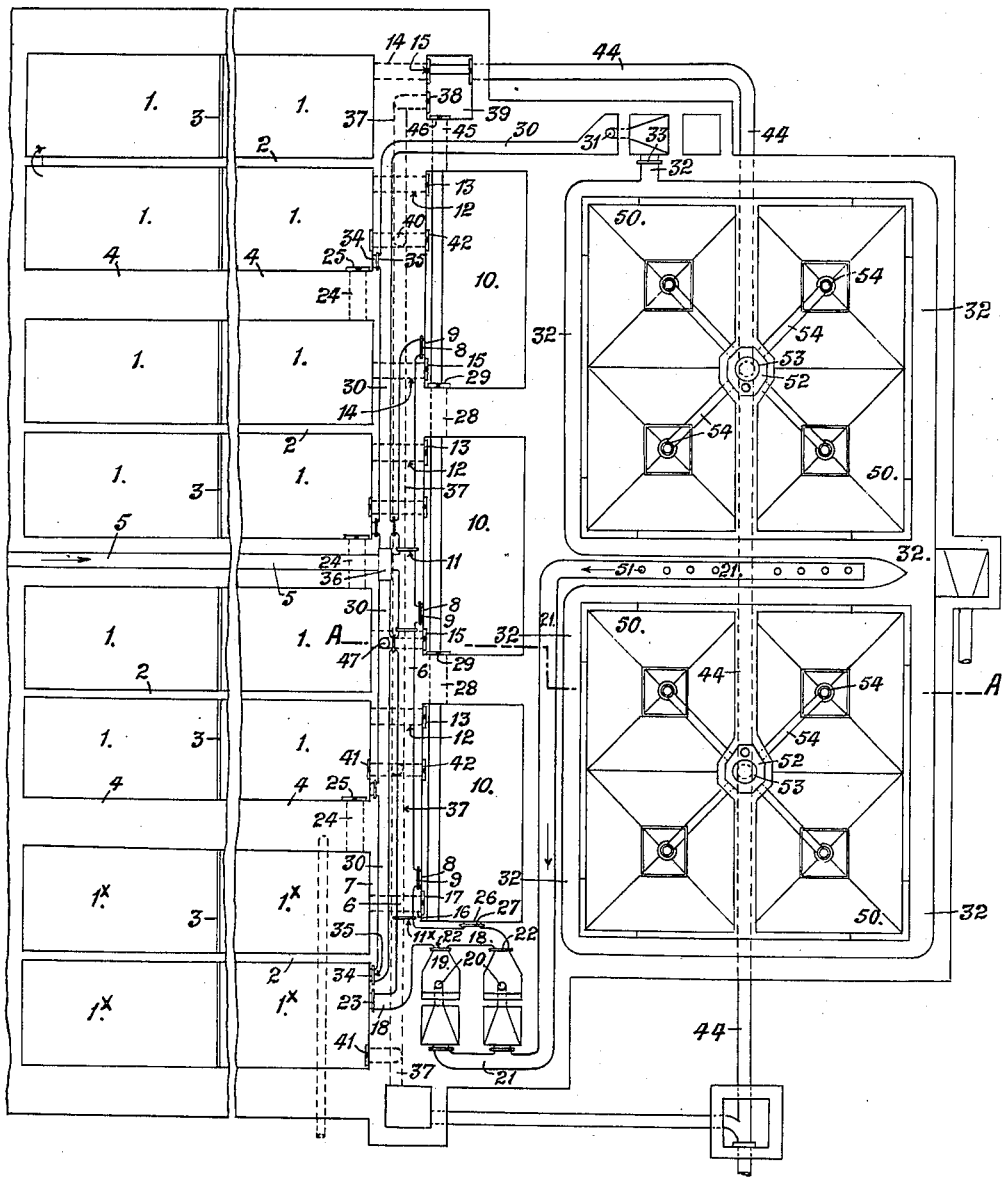

May 29, 1923.

J. A. COOMBS 1,456,914

SYSTEM FOR THE TREATMENT OF SEWAGE AND THE LIKE

Filed Nov. 14, 1922  2 Sheets-Sheet 1

Inventor
J. A. Coombs
by
Attorney

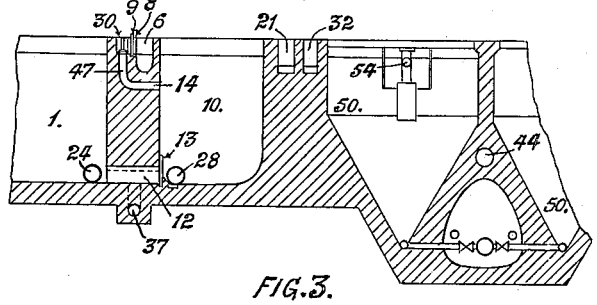
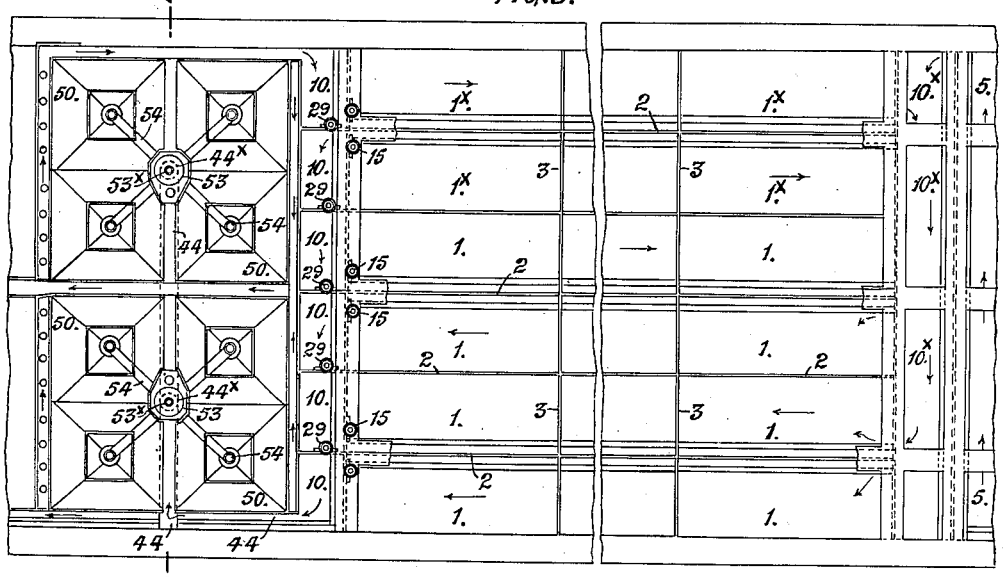
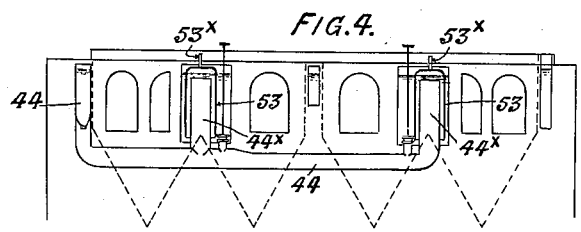

Patented May 29, 1923.

1,456,914

UNITED STATES PATENT OFFICE.

JAMES ALGER COOMBS, OF HAMPSTEAD, LONDON, ENGLAND.

SYSTEM FOR THE TREATMENT OF SEWAGE AND THE LIKE.

Application filed November 14, 1922. Serial No. 600,952.

*To all whom it may concern:*

Be it known that I, JAMES ALGER COOMBS, a subject of the King of England, and residing at Hampstead, in the county of London, England, have invented Improvements in Systems for the Treatment of Sewage and the like, of which the following is a specification.

This invention has reference to systems of purifying sewage and analogous impure liquids of the type in which the purification is effected by the action of aerobic bacteria or other similar forms of germ life, upon a mass or body of sewage or liquid, and wherein the prepared sludge, or sludge culture or a portion thereof is retained, and the aerobic bacteria are preserved and kept in an active state by their distribution in and with this sludge throughout the whole of the liquid. Further the invention has reference to plants wherein a plurality of crude sewage treating tanks, and also tanks for the aeration or treatment of the sludge separated from the treated liquid, are employed, and one or more of the tanks can be temporarily isolated or put out of operation as regards purification, as may be desired.

One of the chief objects and effects of the invention is to provide improvements in connection with plants as referred to, by which the risk of septic action of the sludge, which would occur to the sludge if it remained quiescent in bulk under such conditions, as have hitherto existed, is avoided; while also other objects and effects hereinafter described are accomplished.

In the plant, a plurality of tanks with supply and discharge conduits or ways for the liquids introduced into them to pass through them, and be discharged from them, is employed in conjunction with other or connecting chambers, and they are provided with valves or controlling devices in connection with intercommunicating conduits. By these means the sewage can be caused to pass through the treating tanks of the plant, either separately or a plurality of same, and distributed to the tanks, and conducted from them, as may be desired. Further in connection with these tanks there are a plurality of settling tanks, and tanks into which the sludge settled from the treated liquor in the settling tanks, is passed, and in which it is supplied with air and aerated, and the activity and culture of the bacteria contained in the sludge increased and rendered highly effective; and the revivified or treated sludge is subsequently taken and passed into the crude sewage treating tanks, and the whole aerated and treated therein.

The several chambers or tanks of the main aeration or treating part of the plant are provided with connecting or communicating conduits by which such tanks may be put in communication with each other, or cut off from one another, by valves or penstocks; and also each of said treating tanks or sections of tanks of the plant, has communication conduits with the several connecting chambers referred to, having valves or penstocks thereon so that liquid from the different treating tanks can be passed to others, and one or more isolated or cut out as desired.

These several connecting chambers communicate with one another by passages with controlling valves upon them; and the communicating conduits exist or may exist, both at the upper and lower parts of the tanks; and in connection with the tanks and chambers there is provided a draw-off pipe common to all the same, and at the bottom of same; and treated liquid is conducted to the respective settling tanks or sets of same, as required; and these tanks may be of the alternating type, in which one is being supplied with liquid while the other is quiescent, and the supply of treated liquid to one or the other, from the main conduit may be effected or controlled by airlock arrangements, in which air is caused to hold back the flow to one tank, while it is released to another. This conduit which carries the liquid to the settling tanks, is furnished with controlling valves or penstocks.

The sludge which is to be aerated and revivified is in some cases raised by airlifts into a conduit common to the settling tanks; and by which it is passed into the sludge aeration tank, and after aeration therein is conducted, or some of it is conducted into the treating tanks, and used therein to act upon the crude sewage being supplied.

During periods of the year when there is no demand for sludge as a fertilizer the volume of sludge produced is reduced to a minimum; and this is effected by allowing the activated sludge to become septic, so that a great reduction of bulk is obtained, which is obtained by intermittent aeration and standing for long periods without aeration. Or in a tank or subdivision of one of the aeration tanks anaerobic organisms are cultivated; and at such times the sludge may be inoculated thereby in a tank for reduction in bulk as aforesaid.

Further, during the periods when the maximum amount of sludge is required, this may be inoculated with special cultures of nitro fixing organisms to increase nitrogen in same to a maximum, by arranging a tank or part of a re-aeration unit for this purpose, from which sludge can be drawn off periodically to inoculate the bulk of sludge in the main re-aeration tanks.

Examples of the nitro fixing organisms referred to are: *Clostridium pasteurianum* (Winogradsky); *Clostridium americanum* (Pringeneim); and *Azotobacter chroococcum* and *Azotobacter agilis*.

By this system, by closing certain conduits and opening others, and allowing the purified effluent from the settling tanks to pass into one of the areation tanks or units which it is desired to cut out, the sludge or part of it may be forced out of it to the settling tank or tanks, and thus back into the system; and this aeration tank or unit may be left full or partly full of purified effluent requiring little or no aeration, from whence it can flow without further treatment. A mixture of crude sewage and returned sludge is again admitted to it, when the unit is again brought into action.

Thus these various communicating conduits between the different tanks or sets of tanks, and the interconnecting chambers, enable the liquid to be manipulated and by-passed in or through the tanks or some of them as and when desired; and when one or more of the tanks is or are thus cut out of action, the treating tank's capacity may be made to suit varying volumes of flow of sewage in dry weather from maximum day flow to minimum night flow, and also to suit variation between dry and wet weather flows.

Further, by this means, the first flush of storm flow, or a flush of inhibitive matter, can be isolated in one or more of the units or tanks, or set of tanks and treated therein by extra aeration; and when an occasional flush of inhibitive trade waste comes down, it can by being concentrated in one unit, if necessary, be treated with chemicals as well as areated, separately, till the sludge in it, which would be damaged thereby, has its highly active principle or qualities restored.

After well areated sludge is left quiescent, it becomes self digesting, and in process of digesting becomes greatly reduced in bulk, and thus, if the sludge were isolated in one unit or tank sufficiently long, self digestion sets up, but by this invention when it is desired to avoid this action, it can be and is avoided by removing the sludge as described; and also by removing it the risk of septic action is obviated.

Further, by the herein described system of removing sludge from the unit or tank, one liquid is displaced by the other against only a small head, which takes less power than would be required to empty the tanks by pumping; and when it is desired to inspect a tank the sewage and sludge can be displaced by the effluent in the manner described, which effluent can then be emptied into the outfall.

Generally valves or like devices may be used in the channels or gutters or conduits so as to enable the different liquids to be passed to any section or part of the system that may be desired, and other sections or parts cut out or isolated.

When the tanks are provided with longitudinal and transverse walls, having gutters or channels in them and valves or penstocks, a part of the tank can be by-passed or short circuited; and by a further conduit carrying purified effluent, this short circuited part can be filled with same.

With regard to the feature of removing the sludge from a unit or system that is to be cut out, as the effluent will be lifted from the settlement tanks by airlifts or other raising means, this effluent will be saturated with oxygen from previous aeration, and it will not be necessary to return all the sludge from a unit to the system as there will be sufficient dissolved oxygen in the effluent to keep the liquids in the required condition whilst lying in the tank quiescent without aeration.

The subjection of the liquids to the action of air for the purposes in question, that is, the aeration of the liquids can be effected in any known manner.

The drawings hereto annexed, show two slightly modified arrangements of tanks and plant for carrying out the invention, Figure 1 being a plan, and Figure 2 a section at AA Figure 1, showing one arrangement, and Figure 3 being a plan, and Figure 4 a section at BB Figure 3, showing the other.

In the different arrangements the same figures or letters of reference are used to denote the same or corresponding parts wherever they appear.

The arrangement or plant shown in Figures 1 and 2 will be first described.

In this plant there are four sets of tanks or units 1, 1$^x$, to each of which liquid is adapted to be supplied and discharged, and in each unit there are two parallel tanks divided by a partition wall 2, the tanks also having transverse partitions 3 in which near the bottom and in the division wall 2 is an opening for the flow of liquid. 4 are the main division walls between the various units, in the centre one of which is a channel 5 by which the raw sewage is conducted to the plant.

10 are the communicating chambers, of which there are three in the case shown.

A channel 6 is provided in the surface of the end wall 7 of the tank, for distributing the raw sewage from the supply channel 5 to the different tanks and chambers 10, the latter communication being by openings 8, provided with controlling penstocks 9. In the channel itself there are also other penstocks 11 and 11$^x$.

Of the tanks or units 1 and 1$^x$, the latter is for the aeration of the returned sludge from the settling tanks; and the other three are those in which the sewage is treated or acted upon by the sludge, and by the air, this aeration being effected in any known way.

The tanks 1 communicate with the chambers 10 by passages 12, which have on their end within the chambers 10, a controlling penstock 13, whereby liquid from these chambers 10 can flow into the tanks 1 at the inlet ends; while the outflow of the tanks 1 into the chambers 10 takes place through passages 14, controlled by a penstock 15, there being one passage 12, and one 14 leading into and out of each chamber 10, except that at the end of the tank 1$^x$. The liquid in the chambers 10 may be aerated similarly as in the tanks 1.

Regarding this sludge aerating and bacterial invigorating unit 1$^x$, it communicates at its discharge end with one of the chambers 10 by a passage 16—equivalent to the passages 14—controlled by a penstock 17 on its discharge end.

18 is a channel on the surface of the plant into which the sludge from the settling tanks—in which it is deposited—is delivered from chambers 19, into which it is forced by air lifts 20, to the intake side of which the sludge is conducted by a channel 21 leading from the settling tanks. The supply of sludge to the channel 18 is controlled by penstocks 22; and the delivery end of this channel 18 communicates with one end of the channel 6, but is normally separated therefrom by the penstock 11$^x$, and the sludge is discharged into the tank 1$^x$, the delivery being controlled by a penstock 23.

Between each of the tanks 1, there is in the walls 4, at the bottom, a passage 24, controlled by a penstock 25, by which liquid can be passed through the delivery end of one tank of a unit, direct to the inlet part of the next, without going into one of the chambers 10; that is any chamber 10 desired can be by-passed, and if filled with liquid it may be kept pure by aeration.

Thus by means of these inlet passages 12, outlet passages 14, and by-pass passages 24, liquid from the chambers 10 can be passed to the tanks 1, and from such tanks back to the chambers; or alternatively, it can by-pass the chambers 10 by being passed through the passage 24, flowing direct from one tank or unit to another.

The passage 24 between the tank 1$^x$ and the adjacent tank, 1, serves as a sludge outlet from the sludge aeration tank 1$^x$ direct to the first tank, when it is required to so lead it for any purpose; but normally the aerated or reinvigorated sludge will pass from the tank 1$^x$ by the passage 16 into the first chamber 10, into which the raw sewage from the feed channel 6 will be introduced through the opening 8.

If desired, sludge may be conducted to the first communicating chamber 10 direct from the separating tanks by way of the channel 18, through the opening 26, controlled by a penstock 27.

The several chambers 10 communicate with each other by passages 28, controlled by penstocks 29, in the lower parts of their division walls; so that all or any of these chambers 10 can be put in communication with one another. The liquid while in the chambers 10 can be aerated by forcing air through it, or otherwise suitably.

With regard to the filling and keeping full of any of the tanks 1 when they are to be isolated, or for any purpose such as for forcing out sludge therefrom, and returning it to the active part of the plant, by the admittance of the purified effluent water, so as to prevent it getting septic, when a unit is to be cut out or is isolated temporarily, this water is supplied to such a unit by a channel 30 on the surface of the plant, to which it is lifted by an air lift 31, to the inlet end or chamber of which, the purified water from the settling tanks is conducted by a channel 32, having a controlling penstock 33 upon it.

This channel 30 is common to all the tanks 1 and 1$^x$, to which by passages 34, controlled by penstocks 35, water from the channel is led, as required.

The channel 30 has an aqueduct 36 on it where it crosses the crude sewage supply channel 5.

At a level below the bottom of the tanks 1, 1$^x$, there is a general main duct 37, built in the masonry of the plant, having a controlling penstock 38 at one end where it enters a discharge chamber or sump 39; and on it there are T-branches or passages 40, which lead into the tanks 1, 1$^x$, and also into the chambers 10; the tank ends of these T-passages being furnished with penstocks 41, and the chamber ends with penstocks 42.

The treated liquid from the last tank 1 is delivered into the sump 39 by a passage 14, which sump also the furthest chamber 10 communicates with, by a passage 45, controlled by a penstock 46; and the liquid from the sump 39 is led by the pipe 44 into the delivery part of the settling tanks.

A pipe 47, having a controlling valve upon its upper end leads from the bottom of the channel 30 to the middle chamber 10, so that the purified effluent from the channel 30 can be introduced into the chambers 10 for the purpose of displacing sludge or sewage, or any desired purpose.

The settling tanks are marked 50; those shown in the drawing being of the known type in which there are four sections at the bottom of hopper form, into which the falling sludge deposits, and through which liquid is conducted, the sludge being elevated by air lifts 51 (consisting of pipes into the lower parts of which air is forced) into the channel 21, which conveys it to the sludge aerating tank 1×; whilst the mixed treated liquid and sludge are conducted by the pipe 44 into a vessel 52 in the tanks 50, in which is disposed an annular syphonic type of air lock delivery 53, from which vessel the liquid is led and distributed by pipes 54 to a central position over the several hopper bottom parts of the tanks referred to.

The annular inlet 53 is adapted to serve as an air lock (seen in section in Figure 4), by which the tanks 50 can be alternately supplied with liquid, and the supply cut off, whereupon a settling under undisturbed or quiescent conditions, can take place. The alternating action of applying the air lock to a tank inlet and removing it, is effected by supplying variations of pressure of air, produced in any suitable way, to the air locks 53; but the flow of liquid to be settled and the settlement of the sludge is continuous; and the sludge is returned from both settling tanks by the air lifts 51, into the return sludge channel 21. A suitable period in general cases, of flow through a settling tank may be about 15 to 30 minutes, and the period when no liquid is supplied, and quiescent settling is taking place, may be about 15 to 30 minutes, during the latter half of which period the sludge is withdrawn, and delivered to the channel 21 by the air lifts 51.

In the modification shown in Figures 3 and 4, the first two tanks 1× are arranged and shown to be sludge aeration tanks; and the sludge from the settling tanks 50 is returned to the first communicating tank 10—of which there is one at the inlet end of each tank—and thence to the other, which communicates with same. At the other end of the tanks 1×, the sludge is delivered into a channel or chamber 10×, into the upper end of one of which the crude sewage is led from the channel 5, so that the crude sewage and re-invigorated sludge meet and mix, and then enter the four treating or aerating tanks 1, through passages in the end wall of same, and it passes continuously through these four tanks in parallel streams, and is discharged through their discharge conduits controlled by penstocks 15, in the opposite end walls into the four several chambers 10 at this end, inter-communication between which is controlled by the penstocks 29, from which the mixed treated liquid is led to the settling tanks 50 by the channel 44.

In this plant if the tanks are always full, the division walls 2 between the different tanks may be kept quite thin.

Division walls 3, with an aperture in the bottom, are provided across the tanks; and similar divisions may be employed in the former arrangements.

The air locks in this case are shown in Figure 4. They are placed in the middle of the settling tanks 50, and the treated liquor conducted by the conduit 44, is led up by the rising leg 44×, into the bell pipe 53, which it has over and round it. By supplying compressed air into the bell 53 through a pipe 53×, the liquid in these parts will be depressed below the lip of the pipe 44×, and so its supply is stopped; and when the air is exhausted, the liquid rises above the lip; and so permits flow through, or prevents same, to the two settling tanks or sets of same, resulting when there is no supply in quiescent settling as above described.

It will be seen that under this invention, the complete system consists in treating and acting on the sewage or like liquid by bacterial sludge in suitable quantity, contained in it, and by air, either forced into it or otherwise acting upon it in any known way (whereby the bacteria are cultivated or kept active and purify the sewage or liquid) and also, at the same time, cultivating and applying an-aerobic bacteria to act upon a portion of the sludge which has been aerated in the treatment of the sewage or liquid, so that a surplus of such bacterial sluge is rendered septic, and the sludge is broken up and reduced by "digestion," or, cultivating and applying nitro-fixing organisms, i. e. organisms which have the power to transfer or fix nitrogen from the air used in the process, in the sludge. Thus, at times when it is desired to produce a sludge fertilizer rich in nitrogen available for use by plants, this latter part of the operation is made use of, resulting in the production of a fertilizing sludge having a maximum content of nitrogen; and on the other hand, when excess sludge is not required to be made, some of that made is digested, resulting in the absence of surplus, or much surplus sludge; and this can be conducted and carried out in one or more of the tanks or units of the plant, and to the liquid or sludge being operated upon, a small quantity of sewage can be introduced; that is, a small quantity can be passed through the tanks in which the operation is being carried on; and the liquid containing the cultivated bacteria flowing from the tank, will be mixed with the general flow of sewage, and the return sludge in order to inoculate it.

By the arrangement and system of purifying plant herein comprised, these "sub-operations" can be carried on; or put out of action and use, at will.

When the whole system is being used, it will comprise three operations, namely, (1) the purifying treatment, (2), the an-aerobic bacteria cultivation and use, and (3), the nitro-fixing bacteria cultivation and use.

The arrangement and form of plant, and mode of carrying on the operations herein described enables the capacity of the tanks containing liquid under purification action to be kept proportional to the volume and strength of sewage being treated; and in dry weather the flow varies, being at a maximum about 10 a. m. in cases where the works are close to the centre of population, and the strength of the sewage is also greatest at this time, and in such a case all available tanks or units can be in operation during this period.

At night, in dry weather rate of flow falls off to a fraction of the sewage daily flow, and the sewage at this time is the weakest; in which case say only one aeration or treating tank may be necessary for treating and purifying the sewage; and in some cases even the chambers 10 will be sufficient if the mixture of sewage and sludge is aerated in them, say by forcing air through same from the bottom, or applying it at the surface.

In the case of a flush of inhibitive chemical or other inhibitive trade waste, the sewage can be confined to treatment in one or more of the units of the plant, and when the flow of this inhibitive matter ceases, the tanks so used can be isolated and the whole contents aerated, whilst in isolation, and after sufficient aeration, these tanks or units can be again brought into integral operation of the whole system.

In the case of a sudden storm a great flushing of sewers results, and the flow during the first hour of this flush, contains an excessive amount of suspended matter. In such a case the same procedure as just described with reference to inhibitive sewage or liquid, can be applied and used, so that as regards storm tanks in sewage plants under this invention, they are not required, provided the settlement tanks are adapted to receive and treat the maximum rate of storm flow.

Regarding the return of purified effluent for filling the tanks, and connecting chambers, which are isolated or temporarily out of action, in addition to the use of this returned liquid as a means of discharging or ejecting the sludge that may be in same, and when a tank or unit, or two or more of same are required to be isolated and put out of action temporarily, they are always kept full of liquid by the system, and therefore the division or party walls between the units are in equilibrium as regards pressure, and in consequence relatively strong walls are not required; and generally, the strains on the walls and foundations are constant, and so they are not strained variable degrees at different parts; and furthermore, the minimum number of units can be used with a consequent reduction of cost of construction.

A further purpose and effect of the system hereinabove described is that it allows for varying the proportion of the plant used for aerating or treating sewage, and that for aerating the return sludge. For instance, the strength of sewage varies at different parts of the year, and it is advantageous to be able to vary the proportion of tanks or units devoted to the aeration of the returned sludge at these seasons. Also during the storm flow, and after the first hour the strength of the sewage diminishes, due to dilution by the rain, and at such times, the time necessary for the sewage being treated, to be in contact with, and acted upon and purified by the sludge, is very short; so that even with a storm flow of from three to six times daily water fall less quantity of the tanks is required for aeration or treatment of the crude sewage.

What is claimed is:—

1. A sewage purifying system, comprising a plurality of treating tanks, a plurality of sludge aerating tanks, a plurality of auxiliary tanks, a plurality of settling tanks, each of said auxiliary tanks having inlet and outlet communication with the treating tanks, an outlet communication with the sludge aerating tanks, and means whereby the material from the settling tanks may be delivered to the sludge aerating tanks or to the auxiliary tanks at will.

2. A sewage purifying system, including a plurality of treating tanks, a plurality of sludge aerating tanks, a plurality of auxiliary tanks, a settling tank, means whereby the material from the settling tank may be delivered to the sludge aerating tank, treating tanks, or auxiliary tanks at will, said auxiliary tanks having controlled inter-communication and having inlet and outlet communication with each of the treating tanks.

3. A sewage purifying system, comprising a plurality of treating tanks, a plurality of sludge aerating tanks, a plurality of auxiliary tanks, a plurality of settling tanks, each of said auxiliary tanks having inlet and outlet communication with the treating tanks, an outlet communication with the sludge aerating tanks, and means whereby the material from the settling tanks may be delivered to the sludge aerating tanks or to the auxiliary tanks at will, a sump having a delivery communication with the settling tanks, an inlet communication with each of the treating tanks and sludge aerating tanks.

4. A sewage purifying system, comprising a plurality of treating tanks, a plurality of sludge aerating tanks, a plurality of auxiliary tanks, a plurality of settling tanks, each of said auxiliary tanks having inlet and outlet communication with the treating tanks, an outlet communication with the sludge aerating tanks, and means whereby the material from the settling tanks may be delivered to the sludge aerating tanks or to the auxiliary tanks at will, a sump having a delivery communication with the settling tanks, an inlet communication with each of the treating tanks and sludge aerating tanks and with each of the auxiliary tanks.

In testimony whereof I have signed my name to this specification in the presence of two subscribing witnesses.

JAMES ALGER COOMBS.

Witnesses:
P. A. SANDFORD,
WILLIAM CHARLES CODY.